United States Patent
Raja et al.

(10) Patent No.: US 10,129,361 B2
(45) Date of Patent: Nov. 13, 2018

(54) SYSTEM AND METHOD FOR MULTI-VERSION REMOTE FUNCTION EXECUTION CONTROL IN A DISTRIBUTED COMPUTING ENVIRONMENT

(71) Applicant: Oracle International Corporation, Redwood Shores, CA (US)

(72) Inventors: Harvey Raja, Manchester (GB); Gene Gleyzer, Lexington, MA (US); Aleksandar Seovic, Tampa, FL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 35 days.

(21) Appl. No.: 15/200,906

(22) Filed: Jul. 1, 2016

(65) Prior Publication Data

US 2017/0006129 A1    Jan. 5, 2017

Related U.S. Application Data

(60) Provisional application No. 62/187,536, filed on Jul. 1, 2015.

(51) Int. Cl.
*G06F 15/167* (2006.01)
*H04L 29/08* (2006.01)
*G06F 17/30* (2006.01)

(52) U.S. Cl.
CPC ...... *H04L 67/2842* (2013.01); *G06F 17/3033* (2013.01)

(58) Field of Classification Search
CPC .................. H04L 67/2842; G06F 17/3033
See application file for complete search history.

(56) References Cited

U.S. PATENT DOCUMENTS

| | | | |
|---|---|---|---|
| 5,974,428 A | * | 10/1999 | Gerard ............... G06F 8/71 |
| | | | 707/695 |
| 6,898,618 B1 | | 5/2005 | Slaughter |
| 7,016,966 B1 | | 3/2006 | Saulpaugh |
| 7,200,848 B1 | | 4/2007 | Slaughter |
| 7,207,002 B2 | | 4/2007 | Mireku |
| 7,873,592 B2 | | 1/2011 | Meijer |
| 8,082,491 B1 | | 12/2011 | Abdelaziz |

(Continued)

OTHER PUBLICATIONS

United States Patent and Trademark Office, Notice of Allowance and Fee(s) Due dated Sep. 19, 2016 for U.S. Appl. No. 13/779,536, 11 Pages.

(Continued)

*Primary Examiner* — Jonathan A Bui
(74) *Attorney, Agent, or Firm* — Tucker Ellis LLP

(57) ABSTRACT

A system and method for supporting multi-version remote function execution control in a distributed computing environment is provided. Remote functions are provided with a version identifier which uniquely identifies the version of the remote function. The version identifier can be a digest of the class definition of the remote function. The version identifier is used by an executor and/or class loader to ensure execution of correct class versions when on a node in a distributed computing environment. The definitive identification of class versions also provides for conditional transmission of class definition thereby reducing communication overhead for distribution of remote functions.

20 Claims, 4 Drawing Sheets

(56) References Cited

U.S. PATENT DOCUMENTS

| | | | |
|---|---|---|---|
| 9,110,711 | B2 | 8/2015 | Abdelaziz |
| 9,201,701 | B2 | 12/2015 | Boldyrev |
| 9,524,323 | B2 | 12/2016 | Meek |
| 2001/0044790 | A1* | 11/2001 | Taivalsaari ............... G06F 9/445 |
| 2005/0229048 | A1 | 10/2005 | Da Palma |
| 2006/0206876 | A1 | 9/2006 | Barton |
| 2006/0212847 | A1 | 9/2006 | Tarditi |
| 2008/0178140 | A1 | 7/2008 | Lin |
| 2008/0282266 | A1* | 11/2008 | Kabanov ................. G06F 9/443 |
| | | | 719/320 |
| 2009/0320045 | A1* | 12/2009 | Griffith ................... H04L 67/34 |
| | | | 719/315 |
| 2009/0328013 | A1 | 12/2009 | Aharoni |
| 2009/0328016 | A1 | 12/2009 | Maly |
| 2010/0257507 | A1* | 10/2010 | Warren ..................... G06F 8/40 |
| | | | 717/106 |
| 2011/0202906 | A1 | 8/2011 | Asao |
| 2012/0079464 | A1 | 3/2012 | De Smet |
| 2013/0125101 | A1 | 5/2013 | Pamer |
| 2013/0132070 | A1 | 5/2013 | Dayan |
| 2013/0159981 | A1 | 6/2013 | Klemenz et al. |
| 2014/0129719 | A1* | 5/2014 | Weber ................... H04L 47/823 |
| | | | 709/226 |
| 2014/0359043 | A1* | 12/2014 | Gao ...................... G06F 15/167 |
| | | | 709/212 |
| 2015/0301809 | A1* | 10/2015 | Goetz ................... G06F 9/4428 |
| | | | 717/140 |
| 2016/0092205 | A1 | 3/2016 | Seovic |
| 2016/0147547 | A1* | 5/2016 | Elias ................... G06F 9/44521 |
| | | | 717/166 |

OTHER PUBLICATIONS

Hinkel, Frank "Software Engineering, Architecture." N.P., Nov. 28, 2012. WEB. Sep. 21, 2016, 8 Pages.

Box, Don. "LINQ:.NET Language-Integrated Query." N.P., Feb. 2007. WEB. Sep. 21, 2016, 32 Pages.

Hejtmanek, Martin. "From Developers to Developers." N.P., Dec. 6, 2011. WEB. Sep. 21, 2016, 11 Pages.

* cited by examiner

SYSTEM AND METHOD FOR MULTI-VERSION REMOTE FUNCTION EXECUTION CONTROL IN A DISTRIBUTED COMPUTING ENVIRONMENT

CLAIM OF PRIORITY

This application claims priority to U.S. Provisional Patent Application No. 62/187,536, filed Jul. 1, 2015 entitled "SYSTEM AND METHOD FOR MULTI-VERSION REMOTE FUNCTION EXECUTION CONTROL IN A DISTRIBUTED COMPUTING ENVIRONMENT" which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and more particularly to a distributed computing environment.

SUMMARY

Dynamic lambdas introduce the ability to transmit a definition of a remote function from a client node to be executed on a server node recipient in a distributed data grid, such as an Oracle® Coherence distributed data grid. Descriptions of lambda expressions and their use in a distributed date grid are described in U.S. Pat. No. 9,195,442 titled "SYSTEM AND METHOD FOR COMPILING LAMBDA EXPRESSION IN A PROGRAMMING LANGUAGE ENVIRONMENT" issued Nov. 24, 2015, U.S. patent application Ser. No. 13/779,536 titled "SYSTEM AND METHOD FOR SUPPORTING COMPATIBILITY CHECKING FOR LAMBDA EXPRESSION" filed Feb. 27, 2013, and U.S. patent application Ser. No. 14/864,558 titled "SYSTEM AND METHOD FOR SUPPORTING DYNAMIC DEPLOYMENT OF EXECUTABLE CODE IN A DISTRIBUTED COMPUTING ENVIRONMENT" filed Sep. 24, 2015, all of which applications are incorporated by reference. However, a drawback to the dynamic deployment of executable code (such as lambda expressions) in a distributed computing environment (such as a distributed data grid) is that, in most situations, the executable code is deployed indiscriminately, without considering whether the remote function has already been defined at a recipient/executor. Additionally, because of versioning, a function with a same classfile identity/name yet a different definition version can cause an incorrect function to be executed.

For example, within a Java environment, it can be difficult to identify the version of a function, and, more importantly, the runtime artifact—e.g., the classfile—because classfiles are typically loaded by name. If two functions have the same classfile identity (name), yet different versions, there currently exists no way to identify the distinct versions to ensure that the correct function is sent and/or executed. To overcome this problem, the definition of the function may need to be submitted every time a class file is executed. This provides unnecessary overhead because class file definitions are resubmitted and potentially recompiled for every operation (regardless of whether the class file has already been executed on a node).

Additional problems can still arise using this approach where, for example, the classfile has already been executed on a node of the distributed data grid on the storage side. In such case the executor on the node can implement the version of the function that was previously executed on the storage side (having the same name) instead of using the new/intended version of the definition submitted. This leads to the possibility that the incorrect version of the named function can be executed because the executor can implement the version that is already operating on the execution platform rather than recompiling from the version that was sent with the dynamic lambda function. One could avoid this problem by performing a byte comparison of the previously submitted and currently submitted functions however, such byte comparison is prohibitively expensive in that it would be resource intensive and degrade system performance as the number of executions increased.

Thus, it is desirable to provide a solution to versioning problems arising from dynamic deployment of executable code (such as lambda expressions) in a distributed computing environment (such as a distributed data grid). It is also desirable to provide a solution which enables executable code to be deployed only when required, and not redeployed if the required version of the remote function has already been defined at a recipient/executor. It is also desirable to provide for correct identification of class files/classfile definition versions to prevent incorrect function versions from being executed without the overhead of bytewise comparisons. The details of deriving an appropriate version are left to the implementer however various techniques can be adopted to strike a balance between execution cost and correctness.

In accordance with embodiments, the present disclosure describes a system and method for supporting multi-version remote function execution control in a distributed computing environment. The system and method reduces overhead and improves performance of dynamic deployment of executable code in a distributed computing environment by providing a mechanism by which executable code is only deployed when required and class files/classfile definitions are uniquely identified to prevent incorrect functions from being executed without the overhead of bytewise comparisons. The system and method utilizes a versioning identifier which is incorporated in the executable code (dynamic lambda function) definition, thus providing a way for the executor of the code to identify and compare the versions of the functions it already has performed on the storage side and the function definition it is receiving (without performing a bytewise comparison of the function definitions).

Additionally, and to further enhance performance of the data grid, in accordance with an embodiment, the method and system also provide the ability to only send definition versions of executable code/dynamic lambdas when required, and for an executor to only request definitions when required, e.g., when the executor determines that it does not already have the correct function version. In such cases a remote function can be called conditionally without including the class definition. The receiving node determines whether it has the correct function version. If the receiving node has the correct function version it executes it. If the receiving node does not have the correct function version it requests it from the remote node and then complies and executes the function after it receives the function definition from the remote node. In addition the submitter may pessimistically send the class file for the first request on each node only engaging the aforementioned Request for Information (RFI) protocol if necessary. This protocol provides that executable code/dynamic lambdas are only deployed one to any particular node thereby reducing communication overhead where the executable code/dynamic lambdas is reused.

In an embodiment, of a system and method for multi-version remote function execution control in a distributed computing environment, the system incorporates a mechanism to uniquely identify a version of a function from a submitter, and a protocol between function submitter and executor(s) to ensure it is defined at most once. This feature provides consistent remote execution based on the function submitter's definition of the function and observed via the side-effects of function execution.

In an embodiment of a system and method for multi-version remote function execution control in a distributed computing environment, the method can begin with receiving, at an executor, a classfile, the classfile including an identifier, the identifier being associated with a version of a lambda function. The method can continue with comparing the received identifier against a plurality of identifiers. The method can continue with, upon the comparison finding no matches, requesting, from a submitter, a definition of the lambda function associated with the received identifier.

These and other objects and advantages of the present invention will become apparent to those skilled in the art from the following description of the various embodiments, when read in light of the accompanying drawings.

DETAILED DESCRIPTION

Figure 1A:
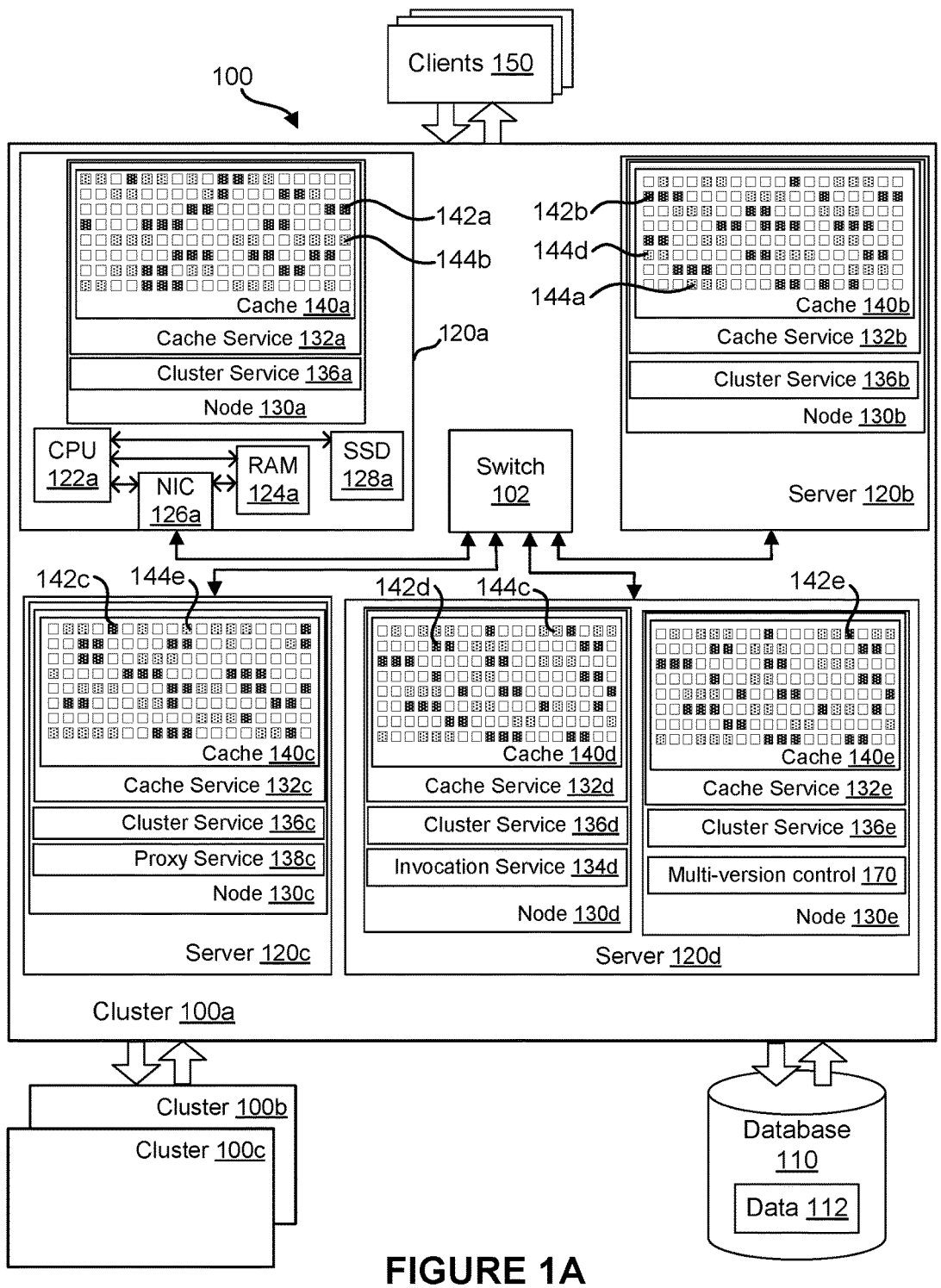
FIG. 1A illustrates a distributed computing environment supporting multi-version remote function execution control, according to an embodiment of the invention.

Described herein are systems and methods which support dynamic deployment of executable code in a distributed computing environment with multi-version remote function execution control. The executable code is associated with an identity which includes a version identifier derived from the executable code and thus unique to a particular version of the executable code. The class identity and version identifier can be used to determine the need for transmitting the class definition to a server node and also to ensure that a correct version of a class is implemented on a server node. Dynamic deployment of executable code enables execution of an agent on the server node where the agent depends on a new class definition otherwise unavailable to the server node. Multi-version control ensures that the version of the executable code executed on the server node (executor) is identical to the version specified by the client (submitter). Multi-version control feature can also reduce communication overhead by enabling a protocol for submitting class definitions only when required by the server node.

The systems and methods for supporting dynamic deployment of executable code with multi-version control as described herein and illustrated in FIGS. 1B, 2A, and 2B have particular utility in the distributed data grid described below with respect to FIG. 1A. The systems and methods for supporting dynamic deployment of executable code with multi-version control may also be applied in wide variety of alternative distributed computing environments with a notable benefit of reducing the amount of code deployments required to be coordinated across the distributed computing environment.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A "distributed data grid" or "data grid cluster" is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computationally intensive, stateful, middle-tier applications. In particular examples, distributed data grids, such as e.g., the Oracle® Coherence data grid, store information in-memory to achieve higher performance, and employ redundancy in keeping copies of the information synchronized across multiple servers, thus ensuring resiliency of the system and continued availability of the data in the event of failure of a computer server in the cluster.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described herein, without departing from the scope of the invention.

FIG. 1A shows an example of a distributed data grid 100 which stores data and provides data access to clients 150. Distributed data grid 100 is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster.

Distributed data grid 100 stores information in-memory (for example in the RAM of each data node) to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1A, distributed data grid 100 provides data storage and management capabilities by distributing data over a number of computer servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more.

Server 120a of FIG. 1A, is illustrated as having CPU 122a, Memory 124a and NIC 126a (these elements are also present, but not shown, in each of the other Servers 120b, 120c, 120d and servers, not shown, of additional clusters). Optionally each server may also be provided with flash memory—e.g. SSD 128a—to provide spillover storage capacity. When provided, the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better). The servers and clusters can be networked using for example high performance Ethernet or InfiniBand networks.

A cluster 100a preferably contains a minimum of four physical servers to avoid the possibility of data loss during a failure, but a typical installation has many more than four servers per cluster. Failover and failback are more efficient when more servers are present in each cluster and the impact of a server failure on a cluster is lessened. To minimize communication time between servers, each data grid cluster is ideally confined to a single switch 102 which provides single hop communication between all of the servers. A cluster may thus be limited by the number of ports on the switch 102. A typical cluster will therefore include between 4 and 96 physical servers networked using a single switch.

In most Wide Area Network (WAN) implementations of a distributed data grid 100, each data center in the WAN has independent, but interconnected, data grid clusters (e.g., 100a, 100b, and 100c). A WAN may, for example, include many more clusters than shown in FIG. 1A. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid, the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the services provided on nodes of the distributed data gird include, for example, the cluster service, the proxy service, the invocation service, and distributed cache service. The cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. instances of the distributed cache service operating on each of the nodes manage distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1A, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications read and write data to and from the data grid, avoiding expensive requests to back-end data sources such as databases. The shared data cache provides a single, consistent view of cached data. Reading from the cache is faster than querying back-end data sources and scales naturally with the application tier. In-memory data storage alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

In embodiments, the distributed data grid 100 can operate as a distributed computing environment which allows for definition of remote functions to be executed on nodes in the distributed data grid. In accordance with embodiments of the present invention, the distributed data grid implements a multi-version control system 170, as described below, on some or all nodes of the distributed data grid. Multi-version control system 170 provides a mechanism to uniquely identify versions of remote functions without analysis of all the instructions within the function. The multi-version control system 170 ensures consistent and predictable execution of remote functions in the distributed data grid with reduced overhead and increased performance. Multi-version control system 170 incorporates a mechanism to uniquely identify a version of a function from a submitter, and a protocol between function submitter and executor(s) to ensure the function is defined at most once. This feature provides consistent remote execution based on the function submitter's definition of the function and observed via the side-effects of function execution.

Multi-Version Remote Function Execution Control

In accordance with an embodiment, a system and method for supporting multi-version remote function execution control in a distributed computing environment is provided. The system and method is in some embodiments implemented in a distributed data grid as version control system 170. Multi-version remote function execution control provides a mechanism to uniquely identify a function definition without analysis of all the instructions within the function. This ensures that the same version of a remote function is executed on the host/executor as is specified by the client/submitter.

In an embodiment, multi-version remote function execution control also enables a submitter of a remote function to conditionally send the function definition. That is the submitter can call the function using a classfile identity and version identifier without initially submitting the class definition. If the executor discovers it already has the appropriate classfile as indicated by the classfile identity and version identifier, the executor may execute the function. If the executor discovers it does not already have the appropriate classfile as indicated by the classfile identity and version identifier, the executor may request submission of the class definition from the submitter—a protocol implemented by the executor provides for requesting the function definition of submitted remote functions which do not match local functions. The submitter then submits the classfile definition for compilation and execution by the executor. In embodiments, a special classloader is provided which loads classes as specified by identity and version identifier rather than loading classes by name alone.

Multi-version remote function execution control is implemented by providing a version identifier in the function definition of the executable function such as a lambda expression. The version identifier enables the host/executor to compare the versions of executable functions by comparing version identifiers (instead of performing a bytewise comparison of the function definitions). In accordance with an embodiment, the version identifier is digest of the executable code that provides a unique identifier for the particular version of the executable code. The digest can be, for example, an MD5/SHA1 or other hash function of the executable code. The MD5 or other hash function can be performed on the executable code by a submitter as part of the submission process. The version identifier can be transmitted to the executor when calling for remote execution of code. The executor can use the class name and version identifier to determine whether the local version of the class is identical to the version requested. If the version is identical it can be implemented. If it is not identical, the class definition included in the submission can be compiled and implemented.

Additionally, and to further optimize performance of the distributed data grid, in accordance with an embodiment, the method and system also provide the ability to only send definitions of versions of executable functions when required, and for an executor to request definitions of versions of class files when required, e.g., when the executor determines that it does not have the correct function version. This reduces communication overhead associated with the submission of executable functions. Class definitions for classes which are already available to the executor (as verified by identity and version identifier) do not need to be transmitted.

Figure 1B:
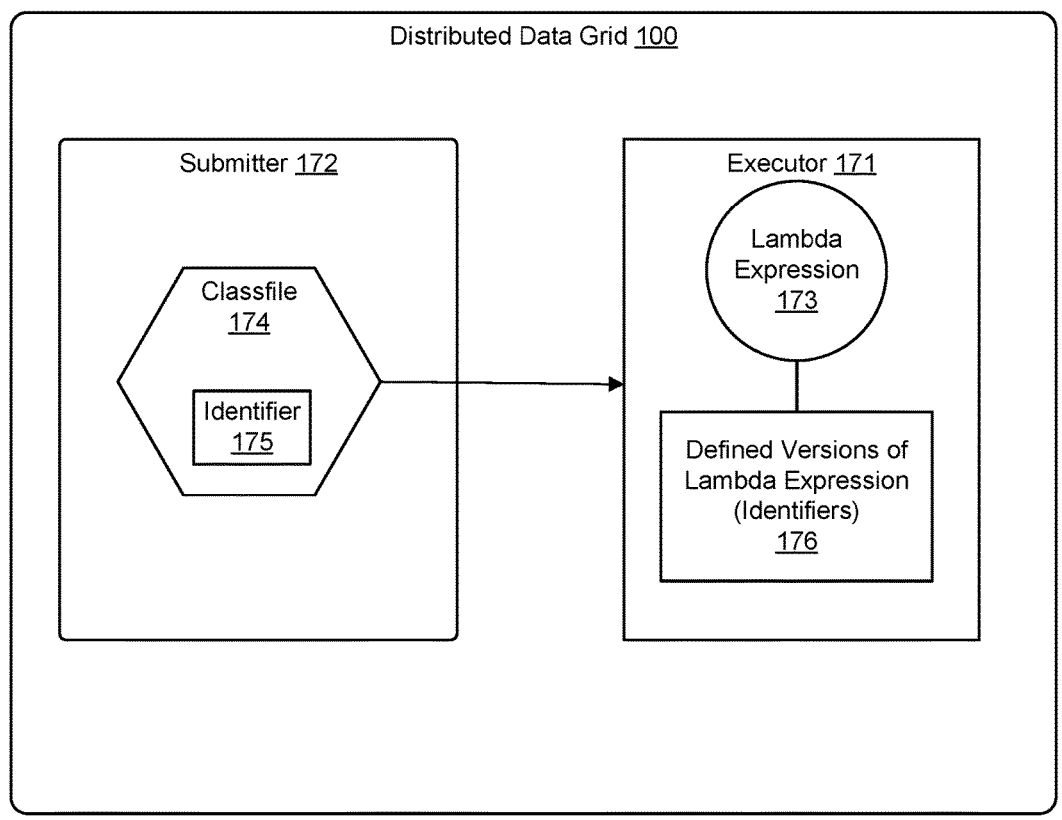
FIG. 1B illustrates deployment of multi-version remote functions I the distributed computing environment of FIG. 1A, according to an embodiment of the invention.

FIG. 1B illustrates a system supporting multi-version remote function execution control in a distributed computing environment such as distributed data grid 100 of FIG. 1A. As shown in FIG. 1 B, the submitter 172 can submit a classfile 174 which contains an identifier 175. The executor 101 can receive the classfile, which can be translated into, for example, a lambda expression 173 and compare the identifier 175 with defined versions of the lambda expression (e.g., identifiers) 176 it has previously performed and stored. The submitter 172 can be a process running on a node in the distributed data grid or a client 150. The executor is a process running on one or the nodes in the distributed data grid where the remote function (lambda expression) is to be executed. Typically this will be the node holding in the distributed cache a datum against which the remote function will be executed.

In accordance with an embodiment, the version identifier 175 is a digest an MD5 hash (message-digest algorithm) or another sufficient hash or identifier of the class definition for the submitted remote code. The class identifier/MD5 hash can be added onto the lambda expression class file at the submitter before being transmitted to the executor. In certain embodiments, the MD5 hash function is performed as part of the submission of an executable function by a submitter.

In accordance with an embodiment, when the executor 171 receives the classfile, the attached version identifier/MD5 175 allows the executor 171 to identify the function definition and perform a lookup on the executor side to determine whether the correct version of the classfile version exists on the executor 171. If the correct definition is found, e.g., the same classfile name and version identifier 175 (MD5 hash), then the function can be performed. In embodiments, a special classloader is provided which loads classes as specified by identity and version identifier rather than loading classes by name alone. In accordance with an embodiment, if the executor cannot find the correct class with the correct version identifier, the executor can respond to the submitter with a message, such as Request for Information (RFI) message, that requests that the submitter supply the definition of the function (e.g., a message that informs the submitter that the executor does not have the correct executable function definition and that the function cannot be run until a submission of the correct definition). A client, such as a user or an application, can then submit the correct classfile definition version (or decide not to).

Code Execution in a Distributed Data Grid Utilizing Multi-Version Control

In embodiments, the distributed data grid supports the use of agents to perform operations on the nodes of the distributed data grid. For partitioned data, the agent can be configured to execute on the node (or nodes) that owns the data to execute against. The agents thus allow execution of remotely defined code on nodes within the distributed data grid. Queuing, concurrency management, agent execution, data access by the agent and data modification by the agent all occur on that grid node. (Only the synchronous backup of the resultant data modification, if any, requires additional network traffic.) For many processing purposes, it is much more efficient to provide the agent to the node than to handle distributed concurrency control, coherency and data updates. In other words, the distributed data grid determines the location to execute the agent based on the configuration for the data topology, moves the agent there, executes the agent (automatically handling concurrency control for the item while executing the agent), backs up the modifications, if any, and returns a result.

An entry processor is one example of an agent used to perform an operation on the nodes of the distributed data grid. Other examples of agents/executable code include, but are not limited to: aggregators, filters, value extractors, and invocables. In an embodiment, a client submitter of a remote function (expressed for example as a lambda expression) can call the function using a classfile identity and version identifier. If the executor discovers it already has the appropriate classfile as indicated by the classfile identity and version identifier, the executor may execute the function. If the executor discovers it does not already have the appropriate classfile as indicated by the classfile identity and version identifier, the executor may compile the class definition included in the submission or request submission of the class definition from the submitter if not include in the original call. In embodiments, a special classloader is provided which loads classes as specified by identity and version identifier rather than loading classes by name alone.

In an embodiment, the receiver of these remote functions/class files will maintain a custom ClassLoader data structure that allows dereferencing class files based on expiration policy or memory constraints. This unique data structure prevents submitters from polluting receivers in potential DDoS attacks.

Multi-version remote function execution control is implemented by providing a version identifier for each executable function in addition to the class name. The version identifier enables the host/executor to compare the versions of executable functions by comparing version identifiers (instead of performing a bytewise comparison of the function definitions). The version identifier is digest of the executable code that provides a unique identifier for the particular version of the executable code. The digest can be, for example, an MD5 or other hash function of the executable code. The MD5 or other hash function can be performed on the executable code by a submitter as part of the submission process. The version identifier can be transmitted to the executor when calling for remote execution of code. The executor can use the class name and version identifier to determine whether the local version of the class is identical to the version requested. If the version is identical it can be implemented. If it is not identical, the class definition included in the submission can be compiled and implemented.

For example, an agent can be created on a client 150 of the distributed data grid 100 shown in FIG. 1. In order to execute the agent, the agent is serialized and transmitted to one or more node in the distributed data grid 100. To serialize an object means to convert its state to a byte stream so that the byte stream can be reverted back (deserialized) into a copy of the object. Deserialization is the process of converting the serialized form of an object back into a copy of the object. The Java platform specifies a default way by which serializable objects are serialized. A (Java) class can override this default serialization and define its own way of serializing objects of that class. When an object is serialized, information that identifies its class is recorded in the serialized stream. However, the class's definition ("class file") itself is typically NOT recorded. However, for remotely functions defined, for example on clients, the class definition is required for the server to implement the remote function. The system (for example the server) that is deserializing the object can then load the necessary class files using a classloader and the submitted class definition.

In embodiments, the distributed data grid 100 implements a system and method for supporting deployment of remote functions including new class definitions and class definition versions from the client 150 to nodes of the distributed data grid 100 for execution. Additionally, the distributed data grid 100 implements version control for class definitions to ensure that the remote function executed on the distributed data grid has the same class definition as the class on the client 150 where the remote function was prepared. Utilizing the system and method for supporting dynamic deployment of class definitions and version control for class definitions increases the utility of the distributed data grid because it allows remote functions to be correctly executed on nodes of the distributed data grid.

Dynamic Deployment of Remote Functions with Multi-Version Control

Figure 2A:
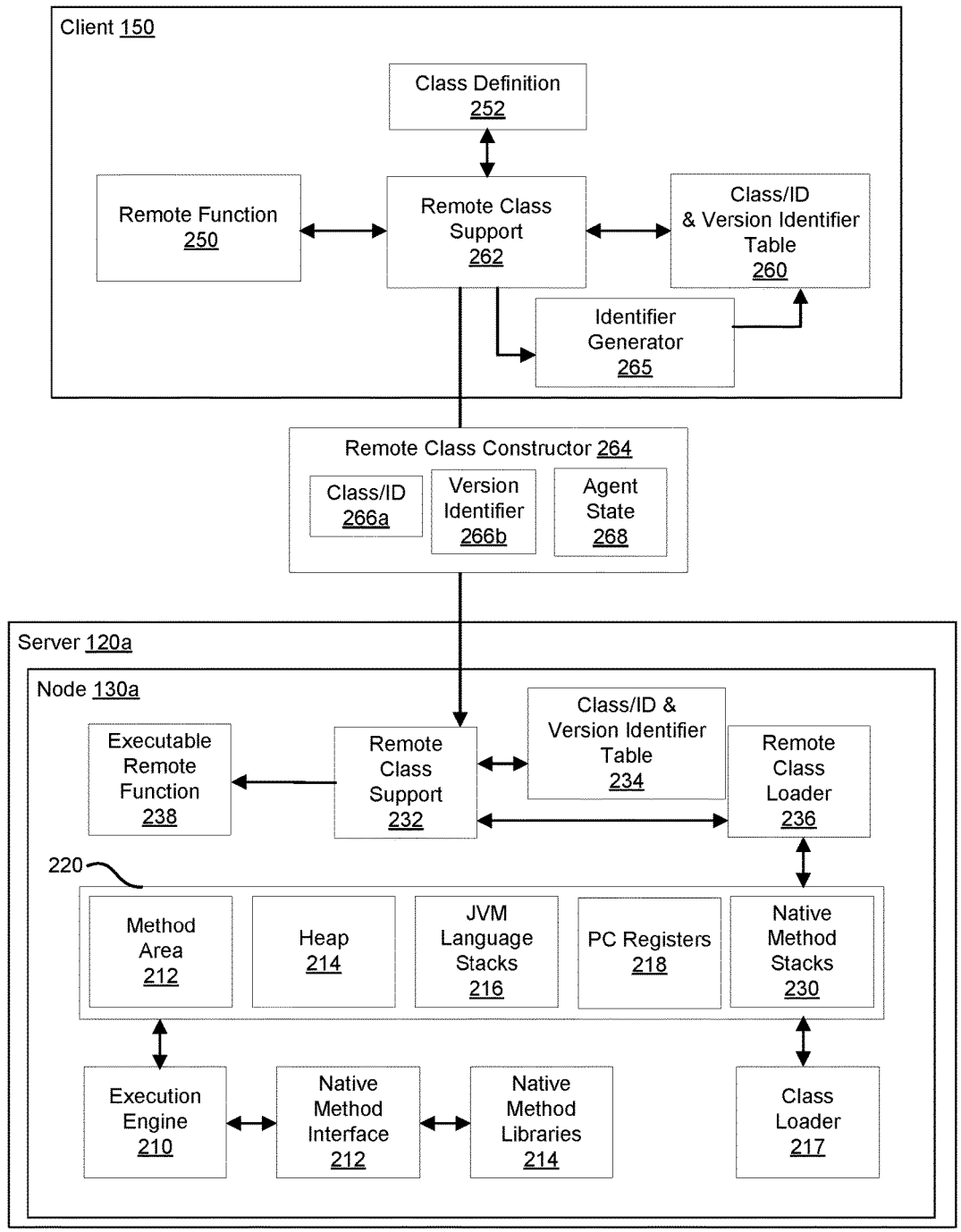
FIG. 2A illustrates a distributed computing environment supporting dynamic deployment of executable code, in accordance with an embodiment of the invention.

FIG. 2A, illustrates a system for dynamic deployment of a new class definitions for remote functions from the client 150 to a node 130a of the distributed data grid to enable an execution of the remote function on the node. Although only one client and one node are shown, the same functionality can be applied on all clients and nodes of the distributed data grid. As shown in FIG. 2A, node 130a is implemented as a Java Virtual Machine (JVM). For example, an Oracle® JRockit JVM, IBM® JVM, Oracle® JVM or another vendor implementation of JVM. Node 130a, includes execution engine 210, native method interface 212, native method libraries 214, and class loader 217. Node 130a has a JVM memory area 220, which includes method area 212, heap 214, JVM language stacks 216, PC registers 218, and native method stacks 230. Upon startup of node 130a, class loader 217 loads and prepares and initializes classes based on class definitions found in the class path for the JVM. Client 150 is provided with remote class support 262 and node 130a is provided with remote class support 232. The remote class support functionality allows for loading class definitions submitted from the client 150 to a node 130a of the distributed data grid in a remote class constructor 264 transmitted over-the-wire from the client 150 to the node 130a as described below. In embodiments of the invention class loading by remote class support utilizes both class name and the version identifier to ensure consistency between the submitted function and the function to be executed on the node.

As shown in FIG. 2A, a user of a client system 150 can prepare remote function 250 to be executed on node 130a. Agent code can include a new class definition 252, which is either a definition of a new class having a new class name or a new version of a class definition for a class (i.e. the class is preexisting). Note that even where the class definition is changed it is technically a new class with a new class definition from the client's perspective. The preexisting class on the client cannot be modified—instead a new class including any changes is implemented. When remote function 250 is sent for execution on node 130a, remote class support 262 examines the remote function 250 and prepares remote class constructor 264 including class definition 252 for the remote function. Remote class support 262 also directs identifier generator 265 to prepare a version identifier 266b for the class definition. For example, identifier generator 265 can prepare a digest such as an MD5 hash of the class definition to be used as the version identifier 266b. The version identifier may be stored with the class/ID in the Class/ID and Version Identifier Table 260.

A remote class constructor 264 can be created which includes new class definition 266a, the version identifier 266b, and the captured agent state 268 required to construct an instance of the agent on the node 130a. The remote class constructor 264 is used for wire transport for the new class and enables automatic serialization of the new class definition for transmission over-the-wire to node 130a. Alternatively, the class definition is not automatically sent but is only sent in response to a request from the receiving node 130a when, for example, the receiving node does not have the defined class or correct version of the defined class as indicated by the class identity and version identifier.

Remote class support 262 utilizes a class/ID and version identifier table 260. Class/ID table 260 includes a class identifier for each preexisting class based on the class name and a hash function (for example an MD5 hash) of the class definition. This ensures that the version identifier for each class is unique. The remote class constructor instance is automatically serialized and transmitted over-the-wire to node 130a.

The remote class constructor 264 is received by the node 130a and processed by remote class support 232. Remote class constructor 264 is deserialized when it is received over-the-wire from client 150 if the remote function version is not present on the node as indicated by the class ID and version identifier. Node 130a can maintains its own Class/ID & version identifier able 260 for validating class identities and versions. Using the deserialized remote class constructor 264 and the remote class support 232, node 130a prepares a class loader for new class definition 266a, loads the class into JVM memory 220, and initializes an instance of the new class in the JVM. Node 130a, is thus enabled to execute code utilizing the class instance based on the new class definition. Remote class support 232 is thus enabled to realize executable remote function 238 for execution on node 130a.

Additionally, and to further enhance performance of the data grid, in accordance with an embodiment, the method and system also provide the ability to only send definition versions of executable code/dynamic lambdas when required (conditional deployment), and for an executor to only request definitions when required, e.g., when the executor determines that it does not already have the correct function version. In such cases a remote function can be called conditionally without including the class definition. The receiving node determines whether it has the correct function version. If the receiving node has the correct function version it executes it. If the receiving node does not have the correct function version it requests it from the remote node and then complies and executes the function after it receives the function definition from the remote node. In addition the submitter may pessimistically send the class file for the first request on each node only engaging the aforementioned Request for Information (RFI) protocol if necessary. This protocol provides that executable code/dynamic lambdas are only deployed one to any particular node thereby reducing communication overhead where the executable code/dynamic lambdas is reused. Where conditional deployment of remote classes is implemented, the remote class constructor 264 can be sent without the class definition. In such case, the remote class support relies on the class/ID 266a and version identifier 266b to ensure that the class with the specified identity and version is present on the node. If not present, the node sends a request to client 150 which can then retransmit the remote class constructor with the required class definition for implementation as described above.

Figure 2B:
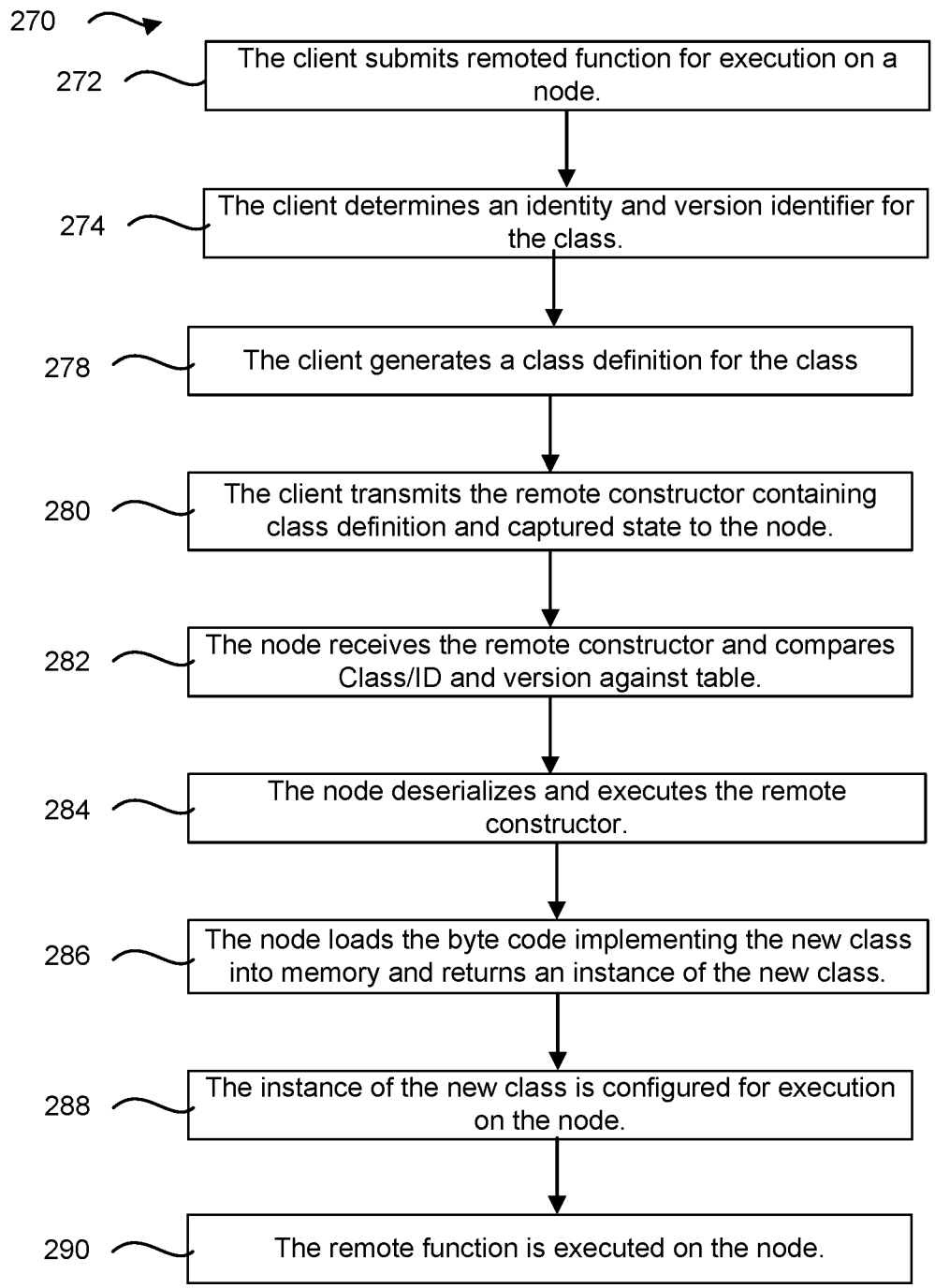
FIG. 2B illustrates a method supporting dynamic deployment of executable code, in accordance with an embodiment of the invention.

FIG. 2B illustrates a method 270 for dynamic deployment of new or updated class definitions from the client 150 to a node 130a of the distributed data grid. At step 272, the client submits a remote function for execution on a node. At step 274, the client determines an identity for the class and version identifier. At step 278, the client generates a class definition for the class. A new class identity and version identifier is also stored in the class id and version identifier table. A remote constructor is prepared on the client. The remote constructor includes the new class definition and the captured state of the agent required to realize the agent on the node. The remote class constructor instance is automatically serialized and transmitted over-the-wire to the node in step 280. Alternatively, the class definition is only sent if it is the first deployment of the code to the particular node or if the node request the code. The client relies on the node to determine whether it has previously received the class definition (for example from a different client) as determined from the class identity and version identifier and request the code (by RFI) if required.

At step 282 the node receives the remote constructor (sent or conditionally sent) over-the-wire from the client. The class identity and version identifier can be compared against class identities and version identifiers for classes/versions already available on the node. At step 284, the remote constructor is deserialized and loaded on the node. A classloader loads the class definition and also utilizes the class/ID and version identifier. At step 286, the new class definition and the captured agent state required to realize the agent is loaded into JVM memory to create an instance of the new or updated class on the node. At step 288, the instance of the class is made available for execution on the node in order to realize the remote function on the node. At step 290, the remote function is executed on the node.

Accordingly, the method allows deployment of remote functions from the client to the node in order to permit implementation of such remote functions. The multi-version controls ensures that the remote function version implemented on the node is identical to the remoted function submitted by the client.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical discs, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting multi-version remote function execution control in a distributed computing environment, the method comprising:
   receiving, at an executor from a first submitter, a first submitter classfile, the first submitter classfile including a version identifier, the version identifier being associated with a class definition for a remote function;
   comparing by the executor the version identifier received from the first submitter against an original plurality of version identifiers;
   responsive to the comparing finding no matches between the version identifier received from the first submitter and the original plurality of version identifiers, requesting by the executor, from the first submitter, the class definition of the remote function associated with the version identifier received from the first submitter;
   receiving, at the executor from the first submitter responsive to the requesting, the class definition of the remote function associated with the version identifier received from the first submitter;
   responsive to receiving the class definition of the remote function associated with the version identifier received from the first submitter, performing the remote function by the executor using the class definition for the remote function, and updating by the executor the original plurality of version identifiers as an updated plurality of version identifiers by adding to the original plurality of version identifiers the version identifier associated with the class definition for the remote function received from the first submitter;
   receiving, at the executor from a second submitter after the updating of the original plurality of version identifiers to the updated plurality of version identifiers, a second submitter classfile, the second submitter classfile including the version identifier;
   comparing by the executor the version identifier received from the second submitter against the updated plurality of version identifiers; and
   responsive to the comparing finding a match between the version identifier received from the second submitter and the updated plurality of version identifiers, performing the remote function by the executor using the class definition previously received from the first submitter.

2. The method of claim 1, wherein the version identifier is a digest of the class definition of the remote function.

3. The method of claim 1, wherein the version identifier is an MD5 hash of the class definition of the remote function.

4. The method of claim 1, further comprising:
receiving the class definition of the remote function at the executor; and
using a classloader to load the remote function defined by the class definition for execution by said executor.

5. The method of claim 1, further comprising:
preparing said first submitter classfile by said first submitter; and
preparing said second submitter classfile by said second submitter.

6. The method of claim 1, further comprising:
preparing said first submitter classfile by said first submitter, wherein said preparing said first submitter classfile includes preparing said version identifier by performing a digest of said class definition; and
preparing said second submitter classfile by said second submitter, wherein said preparing said second submitter classfile includes preparing said version identifier by performing said digest of said class definition.

7. The method of claim 1, further comprising:
preparing said first submitter classfile by said first submitter, wherein preparing said first submitter classfile includes preparing said version identifier by performing an MD5 hash of said class definition; and
preparing said second submitter classfile by said second submitter, wherein preparing said second submitter classfile includes preparing said version identifier by performing said MD5 hash of said class definition.

8. The method of claim 1, further comprising:
the first submitter:
transmitting a first request calling for execution of the first submitter classfile by the executor without the first submitter submitting the class definition for the remote function.

9. The method of claim 1, further comprising:
the first submitter:
transmitting a first request calling for execution of the first submitter classfile by the executor; and
submitting the class definition for the remote function if the first submitter has made no prior request calling for the execution of the first submitter classfile by the executor.

10. The method of claim 1, wherein the requesting by the executor, from the first submitter, the class definition of the remote function associated with the version identifier received from the first submitter comprises:
transmitting by the executor a Request For Information (RFI) to the first submitter.

11. A system supporting multi-version remote function execution control in a distributed computing environment comprising:
a computer server comprising a microprocessor and memory;
a node operating on the computer server; and
an executor operating on the node, the executor configured to:
receive from a first submitter a first submitter classfile, the first submitter classfile including a version identifier, the version identifier being associated with a class definition for a remote function;
compare the version identifier received from the first submitter against an original plurality of version identifiers;
responsive to the comparing finding no matches between the version identifier received from the first submitter and the original plurality of version identifiers, request, from the first submitter, the class definition of the remote function associated with the version identifier received from the first submitter;
receive from the first submitter responsive to the request the class definition of the remote function associated with the version identifier received from the first submitter;
responsive to receiving the class definition of the remote function associated with the version identifier received from the first submitter, perform the remote function using the class definition for the remote function, and update the original plurality of version identifiers as an updated plurality of version identifiers by adding to the original plurality of version identifiers the version identifier associated with the class definition for the remote function received from the first submitter;
receive from a second submitter after the updating of the original plurality of version identifiers to the updated plurality of version identifiers, a second submitter classfile, the second submitter classfile including the version identifier;
compare the version identifier received from the second submitter against the updated plurality of version identifiers; and
responsive to the comparing finding a match between the version identifier received from the second submitter and the updated plurality of version identifiers, perform the remote function using the class definition previously received from the first submitter;
wherein the executor, the first submitter and the second submitter are processes.

12. The system of claim 11, wherein the version identifier is a digest of the class definition of the remote function.

13. The system of claim 11, wherein the version identifier is an MD5 hash of the class definition of the remote function.

14. The system of claim 11, wherein the executor is further configured to:
receive the class definition of the remote function; and
use a classloader to load the remote function defined by the class definition for execution by said executor.

15. The system of claim 11, further comprising:
the first and second submitters, wherein:
the first submitter is configured to prepare said first submitter classfile, wherein said preparing said first submitter classfile includes preparing said version identifier by performing a digest of said class definition; and
the second submitter is configured to prepare said second submitter classfile, wherein said preparing said second submitter classfile includes preparing said version identifier by performing the digest of said class definition.

16. The system of claim 11, further comprising:
the first and second submitters, wherein:
the first submitter is configured to prepare said first submitter classfile, wherein said preparing said first submitter classfile includes preparing said version identifier by performing an MD5 hash of said class definition; and the second submitter is configured to prepare said second submitter classfile, wherein said preparing said second submitter classfile includes preparing said version identifier by performing said MD5 hash of said class definition.

17. The system of claim 11, further comprising:

the first submitter, wherein the first submitter is configured to transmit a request calling for execution of the first submitter classfile by the executor without submitting the class definition for the remote function.

18. The system of claim 11, further comprising:

the first submitter, wherein the first submitter is configured to:
  request calling for execution of the first submitter classfile by the executor; and
  submit the class definition for the remote function if the first submitter has made no prior request calling for the execution of the first submitter classfile by the executor on said node.

19. The system of claim 11, wherein the executor is further configured to:
  request the class definition of the remote function by transmitting a Request For Information (RFI) to the first submitter.

20. A non-transitory computer-readable medium having instruction stored thereon for supporting multi-version remote function execution control in a distributed computing environment, which instructions, when executed cause a computer system in the distributed computing environment to perform steps comprising:

receiving, at an executor from a first submitter, a first submitter classfile, the first submitter classfile including a version identifier, the version identifier being associated with a class definition for a remote function;

comparing by the executor the version identifier received from the fist submitter against an original plurality of version identifiers;

responsive to the comparing finding no matches between the version identifier received from the first submitter and the original plurality of version identifiers, requesting by the executor, from the first submitter, the class definition of the remote function associated with the version identifier received from the first submitter;

receiving, at the executor from the first submitter responsive to the requesting, the class definition of the remote function associated with the version identifier received from the first submitter;

responsive to receiving the class definition of the remote function associated with the version identifier received from the first submitter, performing the remote function by the executor using the class definition for the remote function, and updating by the executor the original plurality of version identifiers as an updated plurality of version identifiers by adding to the original plurality of version identifiers the version identifier associated with the class definition for the remote function received from the first submitter;

receiving, at the executor from a second submitter after the updating of the original plurality of version identifiers to the updated plurality of version identifiers, a second submitter classfile, the second submitter classfile including the version identifier;

comparing by the executor the version identifier received from the second submitter against the updated plurality of version identifiers; and responsive to the comparing finding a match between the version identifier received from the second submitter and the updated plurality of version identifiers, performing the remote function by the executor using the class definition previously received from the first submitter;

wherein the executor, the first submitter and the second submitter are processes.

* * * * *